(12) United States Patent
Guo

(10) Patent No.: US 10,545,715 B2
(45) Date of Patent: Jan. 28, 2020

(54) SPLICING-SCREEN DISPLAY SYSTEM AND SPLICING DISPLAY METHOD

(71) Applicant: BOE TECHNOLOGY GROUP CO., LTD., Beijing (CN)

(72) Inventor: Weiqing Guo, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/240,282

(22) Filed: Aug. 18, 2016

(65) Prior Publication Data

US 2017/0262246 A1 Sep. 14, 2017

(30) Foreign Application Priority Data

Mar. 9, 2016 (CN) .......................... 2016 1 0134786

(51) Int. Cl.
*G06F 3/14* (2006.01)

(52) U.S. Cl.
CPC .......... *G06F 3/1431* (2013.01); *G06F 3/1446* (2013.01)

(58) Field of Classification Search
CPC ...... G06F 3/1431; G06F 3/1446; G06F 13/14; H04L 67/1051; G09G 5/00; G09G 5/60
See application file for complete search history.

(56) References Cited

U.S. PATENT DOCUMENTS

| 6,326,565 | B1 * | 12/2001 | Holtzman | G06F 3/03543 178/19.01 |
|---|---|---|---|---|
| 6,340,957 | B1 * | 1/2002 | Adler | G06F 1/1615 345/1.3 |
| 9,235,373 | B2 * | 1/2016 | Toren | G06F 3/1423 |
| 9,547,070 | B2 * | 1/2017 | Corcos | G01S 13/34 |
| 9,626,015 | B2 * | 4/2017 | Holz | G06F 3/041 |
| 9,709,672 | B2 * | 7/2017 | Manku | G01S 13/74 |
| 9,768,837 | B2 * | 9/2017 | Charvat | H04B 5/0056 |
| 2004/0125044 | A1 * | 7/2004 | Suzuki | G06F 3/011 345/1.1 |
| 2005/0125488 | A1 * | 6/2005 | Kulkarni | G06F 3/1438 709/201 |
| 2005/0168399 | A1 * | 8/2005 | Palmquist | G06F 1/1601 345/1.1 |
| 2010/0053164 | A1 * | 3/2010 | Imai | G06F 3/011 345/427 |
| 2012/0014558 | A1 * | 1/2012 | Stafford | G06T 19/006 382/103 |

(Continued)

*Primary Examiner* — Priyank J Shah

(57) ABSTRACT

A splicing-screen display system and a splicing display method. The system includes: a display array formed by M×N display panels; and an image sending device. Each display panel includes a radar chip, a radar chip corresponding to a reference display panel is a primary chip, and other radar chips are secondary chips. The primary chip is configured to: acquire position information of each secondary chip; and send size information of each display panel, chip information of each secondary chip and position information of each secondary chip to the image sending device. The image sending device is configured to: calculate a panel coordinate of each display panel; divide a display image into M×N sub-images, and calculate an image coordinate of each sub-image; and send each sub-image to a corresponding display panel based on corresponding relationship between image coordinates of the M×N sub-images and panel coordinates of the M×N display panels.

15 Claims, 6 Drawing Sheets

(56) References Cited

U.S. PATENT DOCUMENTS

| | | | | |
|---|---|---|---|---|
| 2012/0062475 | A1* | 3/2012 | Locker | G06F 3/041 |
| | | | | 345/173 |
| 2012/0242893 | A1* | 9/2012 | Akitomo | G06F 3/1446 |
| | | | | 348/441 |
| 2013/0027431 | A1* | 1/2013 | Chu | G06F 3/1446 |
| | | | | 345/644 |
| 2013/0238702 | A1* | 9/2013 | Sheth | H04L 67/38 |
| | | | | 709/204 |
| 2014/0057646 | A1* | 2/2014 | Vaananen | H04W 4/005 |
| | | | | 455/456.1 |
| 2015/0048966 | A1* | 2/2015 | Manku | G01S 13/74 |
| | | | | 342/51 |
| 2015/0070218 | A1* | 3/2015 | Manku | G01S 5/0289 |
| | | | | 342/458 |
| 2015/0153993 | A1* | 6/2015 | Vis | G06F 3/1446 |
| | | | | 345/1.3 |
| 2016/0004351 | A1* | 1/2016 | Kimura | G06F 3/1423 |
| | | | | 345/174 |
| 2016/0094648 | A1* | 3/2016 | Han | H04W 76/10 |
| | | | | 709/209 |
| 2017/0147279 | A1* | 5/2017 | Dobaj | G06F 3/162 |

\* cited by examiner

|  |  |  |  |
|---|---|---|---|
| Sub-image_1 | Sub-image_2 | Sub-image_3 | Sub-image_4 |
| Sub-image_5 | Sub-image_6 | Sub-image_7 | Sub-image_8 |
| Sub-image_9 | Sub-image_10 | Sub-image_11 | Sub-image_12 |
| Sub-image_0 | Sub-image_13 | Sub-image_14 | Sub-image_15 |

FIG. 3B

SPLICING-SCREEN DISPLAY SYSTEM AND SPLICING DISPLAY METHOD

TECHNICAL FIELD

Embodiments of the present disclosure relate to a splicing-screen display system and a splicing display method.

BACKGROUND

An existing splicing-screen display method includes dividing an entire image into sub-images at first and subsequently transmitting the sub-images to sub-screens respectively, where a sequence of the sub-screens is disordered. A complete and correct image can only be formed by manual adjustment of the sequence of the sub-images. Thus, the sub-images cannot be automatically and accurately sent to corresponding display sub-screens for display.

SUMMARY

Embodiments of the present disclosure provide a splicing-screen display system, including: a display array formed by splicing M×N display panels together; and an image sending device. Each display panel includes a radar chip, where a radar chip corresponding to a reference display panel is a primary chip, and other radar chips are secondary chips. The primary chip is configured to: acquire position information of each secondary chip relative to the primary chip by interacting with the corresponding secondary chip; and send size information of a single display panel, chip information of each secondary chip and position information of each secondary chip relative to the primary chip to the image sending device. The image sending device is configured to: calculate a panel coordinate of each display panel corresponding to a respective secondary chip based on position information of the respective secondary chip relative to the primary chip and the size information; divide a display image into M×N sub-images, and calculate an image coordinate of each sub-image; and send each sub-image to a corresponding display panel based on corresponding relationship between image coordinates of the M×N sub-images and panel coordinates of the M×N display panels.

Embodiments of the present disclosure provide a splicing display method of the splicing-screen display system, including: acquiring a distance and an angle of each secondary chip relative to the primary chip by using the primary chip to send a radar wave and to receive feedback of the radar wave from each secondary chip; sending, by the primary chip, the distance and the angle of each secondary chip relative to the primary chip, a prestored height and width of a single display panel, and an ID of each radar chip to the image sending device; calculating, by the image sending device, a panel coordinate of each display panel corresponding to a respective secondary chip relative to the reference display panel based on a distance and an angle of the respective secondary chip relative to the primary chip and the height and the width of the single display panel; dividing, by the image sending device, the display image into the M×N sub-images and calculating an image coordinate of each sub-image; and sending, by the image sending device, each sub-image to the corresponding display panel based on the corresponding relationship between the image coordinates of the M×N sub-images and the panel coordinates of the M×N display panels.

BRIEF DESCRIPTION OF THE DRAWINGS

In order to illustrate the technical solutions in the embodiments of the present disclosure or the existing arts more clearly, the drawings need to be used in the description of the embodiments or the existing arts will be briefly described in the following; it is obvious that the drawings described below are only related to some embodiments of the present disclosure, for one ordinary skilled person in the art, other drawings can be obtained according to these drawings without making other inventive work.

FIG. 3B illustrates 4×4 sub-images corresponding to the 4×4 splicing screens as shown in FIG. 3A;

DETAILED DESCRIPTION

Hereafter, the technical solutions of the embodiments of the present disclosure will be described in a clearly and fully understandable way in connection with the drawings related to the embodiments of the disclosure. It is obvious that the described embodiments are just a part but not all of the embodiments of the present disclosure. Based on embodiments of the present disclosure, all other embodiments obtained by those skilled in the art without making other inventive work should be within the scope of the present disclosure.

The present disclosure provides a splicing-screen display system, which solves the problem in existing technologies that the sub-images cannot be automatically and accurately sent to corresponding display panels for display.

Figure 1:
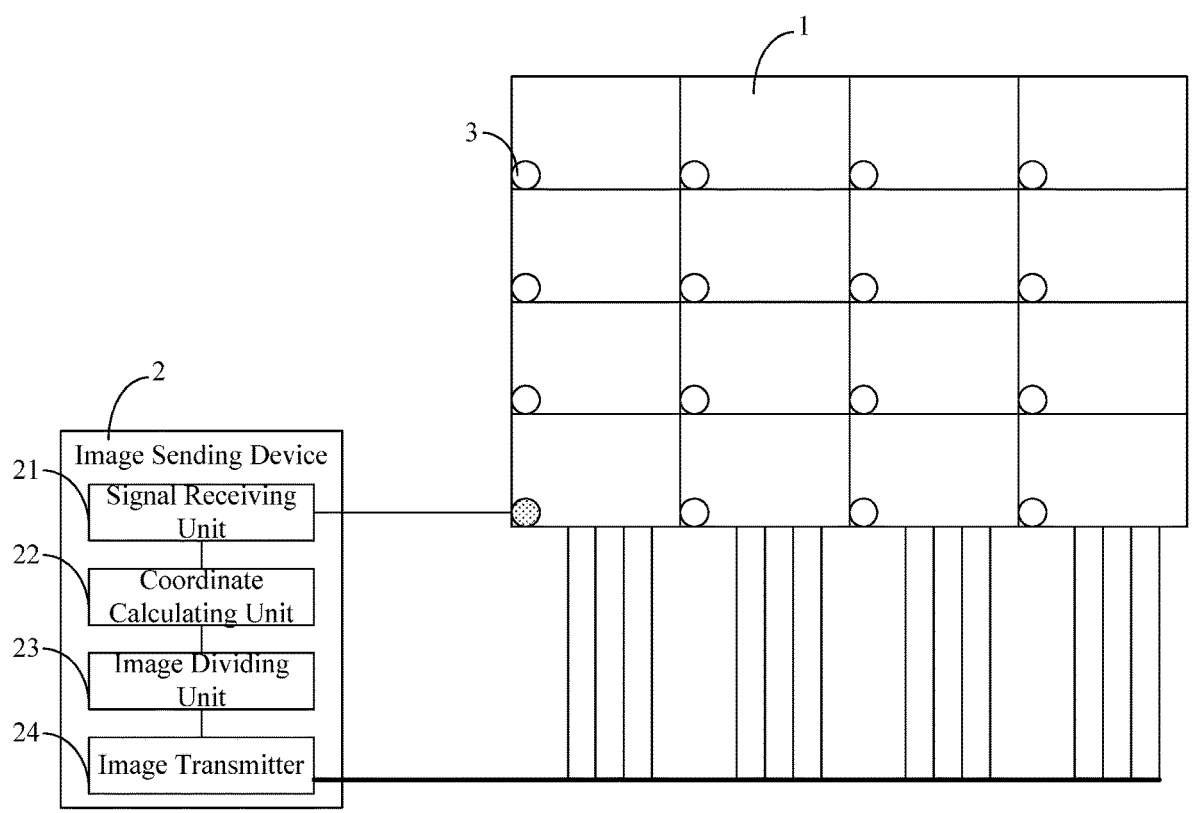
FIG. 1 is a schematic view of a structure of a splicing-screen display system provided by an embodiment of the present disclosure.

As illustrated in FIG. 1, the splicing-screen display system provided by an embodiment of the present disclosure comprises: a display array formed by splicing M×N (M rows and N columns) display panels 1 together; and an image sending device 2. Each display panel 1 includes a radar chip 3. A radar chip 3 of one display panel is a primary chip, and other radar chips 3 in other display panels are secondary chips. The primary chip may be randomly selected. For example, the radar chip 3 shown by a shaded area in FIG. 1 may be the primary chip. A display panel corresponding to the primary chip may be referred to as a reference display panel.

The primary chip interacts with the secondary chips through radar waves, so that the primary chip can acquire position information of each secondary chip relative to the primary chip. The position information may include a distance and an angle of each secondary chip relative to the primary chip. For instance, the primary chip is configured to send electromagnetic wave signals and calculate respective distances and angles between the secondary chips and the primary chip based on different code patterns, time values and angles returned by the respective secondary chips. A distance and an angle of a secondary chip relative to the primary chip represent a distance and an angle of a display panel having the secondary chip relative to the reference display panel having the primary chip. After the distances and the angles are acquired, the primary chip sends size information of a single display panel (e.g., height and width), chip information of each chip (e.g., an ID of the chip) and a distance and an angle of each secondary chip relative to the primary chip to the image sending device 2. For instance, an angle of a secondary chip relative to the primary chip is an angle between a connecting line that connects the center of the secondary chip and the center of the primary chip and a horizontal or vertical direction. As the display panels have block shapes and have small thickness which may be ignored relative to the width and the height, all the radar chips are considered to be disposed in a same plane (a plane parallel to a display plane).

The image sending device 2 is configured to calculate panel coordinates of display panels 1 corresponding to respective secondary chips relative to the reference display panel 1 corresponding to the primary chip based on the distances, the angles and the size information (e.g., the height and the width) of a single display panel 1, and send M×N sub-images to corresponding display panels 1 based on corresponding relationship between image coordinates of the sub-images and the panel coordinates of the display panels.

In the embodiment, a radar chip is disposed on each display panel. By using precise positioning characteristic of the radar chip, the image sending device determines the panel coordinate of each display panel based on data transmitted by the radar chip (including the height and the width of a single display panel, the ID of the radar chip and the distance and the angle of the radar chip relative to the primary chip), and then automatically and accurately sends corresponding sub-images to corresponding display panels for display based on the corresponding relationship between the image coordinates and the panel coordinates. Thus, automatic splicing-screen display can be achieved.

In the embodiment, a schematic structural view of the image sending device 2 is shown in FIG. 1. The image sending device 2 includes: a signal receiving unit 21, a coordinate calculating unit 22, an image dividing unit 23 and an image transmitter 24. The signal receiving unit 21 is connected with the primary chip and the coordinate calculating unit 22; the coordinate calculating unit 22 is connected with the image dividing unit 23, and the image dividing unit 23 is connected with the image transmitter 24; and the image transmitter 24 is connected with each display panel 1.

The signal receiving unit 21 is configured to receive the data transmitted from the primary chip. The data includes the height and the width of a single display panel 1, the ID of each radar chip, and the distance and the angle of each radar chip relative to the primary chip. Of course, the data may also include other data.

The coordinate calculating unit 22 is configured to determine the number of the display panels 1 based on the ID numbers of the chips, establish a first coordinate system by taking a position of the primary chip as an origin point, take the width and the height of the single display panel as a unit length of a horizontal coordinate axis and a unit length of a vertical coordinate axis of the first coordinate system respectively, and calculate the coordinates of the M×N display panels in the first coordinate system (that is, the panel coordinates of the display panels in the first coordinate system) based on the distances and the angles of the respective secondary chips relative to the primary chip. A panel coordinate of a display panel may include a horizontal coordinate value of the display panel on the horizontal coordinate axis and a vertical coordinate value of the display panel on the vertical coordinate axis.

The image dividing unit 23 is configured to establish a second coordinate system that is consistent with the first coordinate system; that is, the second coordinate system takes a lower left corner of an entire display image as an origin point, and takes the width and the height of a single display panel as a unit length of a horizontal coordinate axis and a unit length of a vertical coordinate axis in the second coordinate system respectively. When the size of the display image is not consistent with the size of the display array with the spliced screens, a width and a height obtained after reducing (or enlarging) the width and the height of the single display panel according to a ratio are respectively taken as the unit length of the horizontal coordinate axis and the unit length of the vertical coordinate axis in the second coordinate system respectively. In the second coordinate system, the display image is divided into M×N sub-images; the coordinates of the respective sub-images in the second coordinate system (that is, the image coordinates of the respective sub-images in the second coordinate system) are calculated; and the corresponding relationship between the image coordinates of the respective sub-images in the second coordinate system and the panel coordinates of corresponding display panels in the first coordinate system is established.

The image transmitter 24 is configured to transmit the divided sub-images to corresponding display panels based on the corresponding relationship.

In the embodiment, for the convenience of establishment of the first coordinate system and the subsequent calculation, the radar chip of the display panel 1 on the lower left corner of the display array is taken as the primary chip.

In the embodiment, each radar chip 3 is disposed at a same position within a corresponding display panel 1 (e.g., a lower left corner of each display panel as shown in the figure, which may not affect the display region). Thus, a distance between two adjacent radar chips 3 is a width W of the display panel 1 in the horizontal direction or a height H of the display panel 1 in the vertical direction. That is, a horizontal distance of a secondary chip relative to the primary chip is a multiple of W, and a vertical distance of the secondary chip relative to the primary chip is a multiple of H. Thus, the distance and the angle of the secondary chip relative to the primary chip can be conveniently detected and calculated. As all the radar chips are considered to be disposed in the same plane, only deviation values of corresponding height positions or width positions are needed to be set. But cost in the process for manufacturing the display panel can be increased due to different positions.

Figure 2:
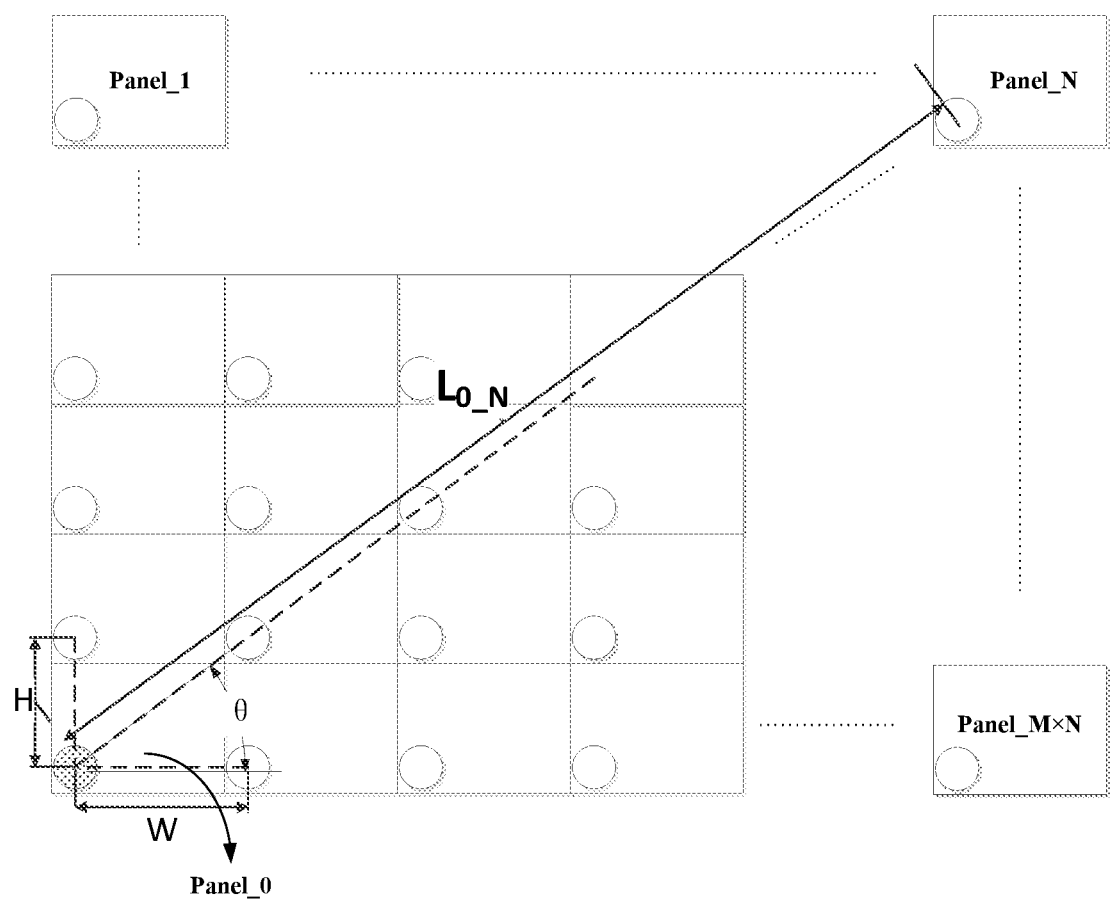
FIG. 2 is a schematic diagram of a first coordinate system including M×N display panels in an embodiment of the present disclosure.

FIG. 2 is a schematic diagram of the first coordinate system in the case of M×N splicing screens. As illustrated in FIG. 2, the radar chip 3 on the lower left corner is taken as the origin point of the first coordinate system, which is the primary chip; and data of the width W and the height H of each display panel are written into the primary chip. The unit length of the horizontal coordinate axis of the first coordinate system is the width W, and the unit length of the vertical coordinate axis of the first coordinate system is the height H. The primary chip is set to be in a sending mode (its main function is sending), and the secondary chips are set to be in a receiving mode (their main functions are receiving). The calculation method of the specific coordinates is as follows:

The distances and the angles of the display panels Panel_1, Panel_2, . . . , Panel_i, . . . and Panel_M×N relative to the reference display panel Panel_0 detected by the radar chips are shown in the following table (e.g., each angle is taken as an angle of a connecting line, which connects a center of a corresponding radar chip to a center of the primary chip, relative to the horizontal direction):

| Panel No. | Distance between Panel_x and Panel_0 | Angle between Panel_x and Panel_0 |
|---|---|---|
| Panel_1 | $L_1$ | 90° |
| Panel_2 | $L_2$ | $\theta_2$ |
| ... | ... | ... |
| Panel_i | $L_i$ | $\theta_i$ |
| ... | ... | ... |
| Panel_M × N | $L_{M \times N}$ | 0° |

For instance, as shown in FIG. 2, the distance between Panel_N and Panel_0 is $L_{0\_N}$, and the angle is $\theta$.

As illustrated in FIG. 2, the numbers of the display panels in the display array in the vertical direction and the horizontal direction are respectively determined based on Panel_1 (the angle of Panel_1 is 90°, and the maximum vertical distance is (M−1)×H) and Panel_M×N (the angle of Panel_M×N is 0°, and the maximum horizontal distance is (N−1)×W). Since $L_1$=(M−1)×H and $L_{M \times N}$=(N−1)×W, it is determined that there are M display panels in the vertical direction and N display panels in the horizontal direction. As for the panel coordinate $(x_i, y_i)$ of any display panel Panel_i, $x_i = L_i \cos \theta_i$ and $y_i = L_i \sin \theta_i$.

Figure 3A:
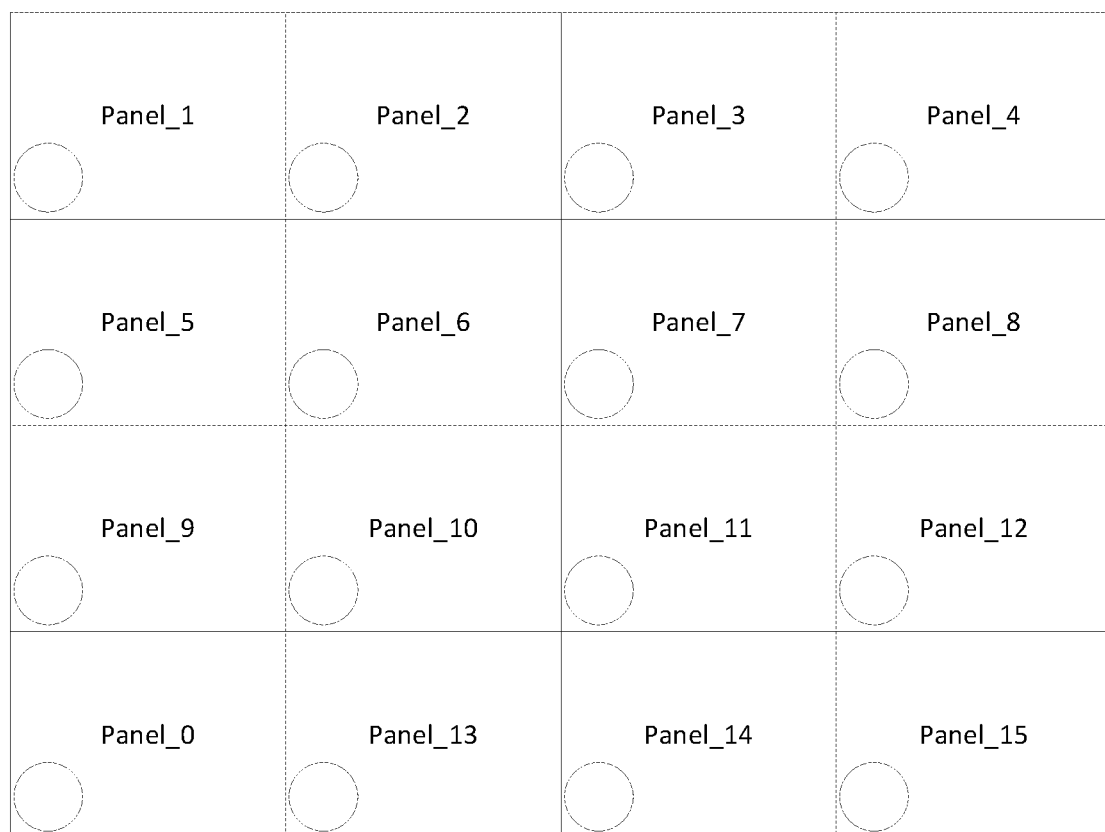
FIG. 3A illustrates a display array formed by splicing 4×4 display panels together in an embodiment of the present disclosure.

FIG. 3A illustrates 4×4 splicing screens, and FIG. 3B illustrates 4×4 sub-images corresponding to the 4×4 splicing screens. The panel coordinates of respective display panels as shown in FIG. 3A and the image coordinates of respective sub-images as shown in FIG. 3B are shown in the following table in a one-to-one correspondence:

| Panel No. | Panel coordinate | Sub-image No. | Sub-image coordinate |
|---|---|---|---|
| Panel_0 | (0, 0) | Sub-image_0 | (0, 0) |
| Panel_1 | (0, 3H) | Sub-image_1 | (0, 3H) |
| Panel_2 | (W, 3H) | Sub-image_2 | (W, 3H) |
| Panel_3 | (2W, 3H) | Sub-image_3 | (2W, 3H) |
| Panel_4 | (3W, 3H) | Sub-image_4 | (3W, 3H) |
| Panel_5 | (0, 2H) | Sub-image_5 | (0, 2H) |
| Panel_6 | (W, 2H) | Sub-image_6 | (W, 2H) |
| Panel_7 | (2W, 2H) | Sub-image_7 | (2W, 2H) |
| Panel_8 | (3W, 2H) | Sub-image_8 | (3W, 2H) |
| Panel_9 | (0, H) | Sub-image_9 | (0, H) |
| Panel_10 | (W, H) | Sub-image_10 | (W, H) |
| Panel_11 | (2W, H) | Sub-image_11 | (2W, H) |
| Panel_12 | (3W, H) | Sub-image_12 | (3W, H) |
| Panel_13 | (W, 0) | Sub-image_13 | (W, 0) |
| Panel_14 | (2W, 0) | Sub-image_14 | (2W, 0) |
| Panel_15 | (3W, 0) | Sub-image_15 | (3W, 0) |

Figure 4:
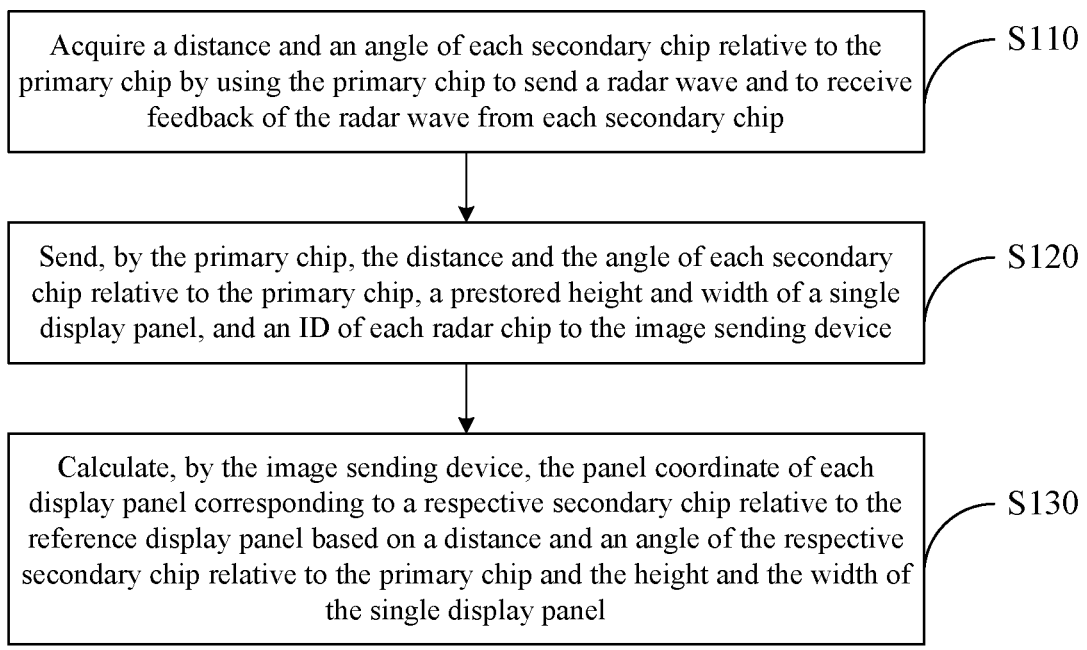
FIG. 4 is a flowchart of a splicing-screen display method provided by an embodiment of the present disclosure.

The present disclosure further provides a splicing display method of the splicing-screen display system. As illustrated in FIG. 4, the method comprises the following steps:

S110: acquiring a distance and an angle of each secondary chip relative to the primary chip by using the primary chip to send a radar wave and to receive feedback of the radar wave from each secondary chip.

S120: sending, by the primary chip, the distance and the angle of each secondary chip relative to the primary chip, a prestored height and width of a single display panel, and an ID of each radar chip to the image sending device. After M×N display panels are spliced together, the ID of each radar chip is set, and the height and the width of the single display panel are stored into the primary chip.

S130: calculating, by the image sending device, the panel coordinate of each display panel corresponding to a respective secondary chip relative to the reference display panel based on a distance and an angle of the respective secondary chip relative to the primary chip and the height and the width of the single display panel.

Figure 5:
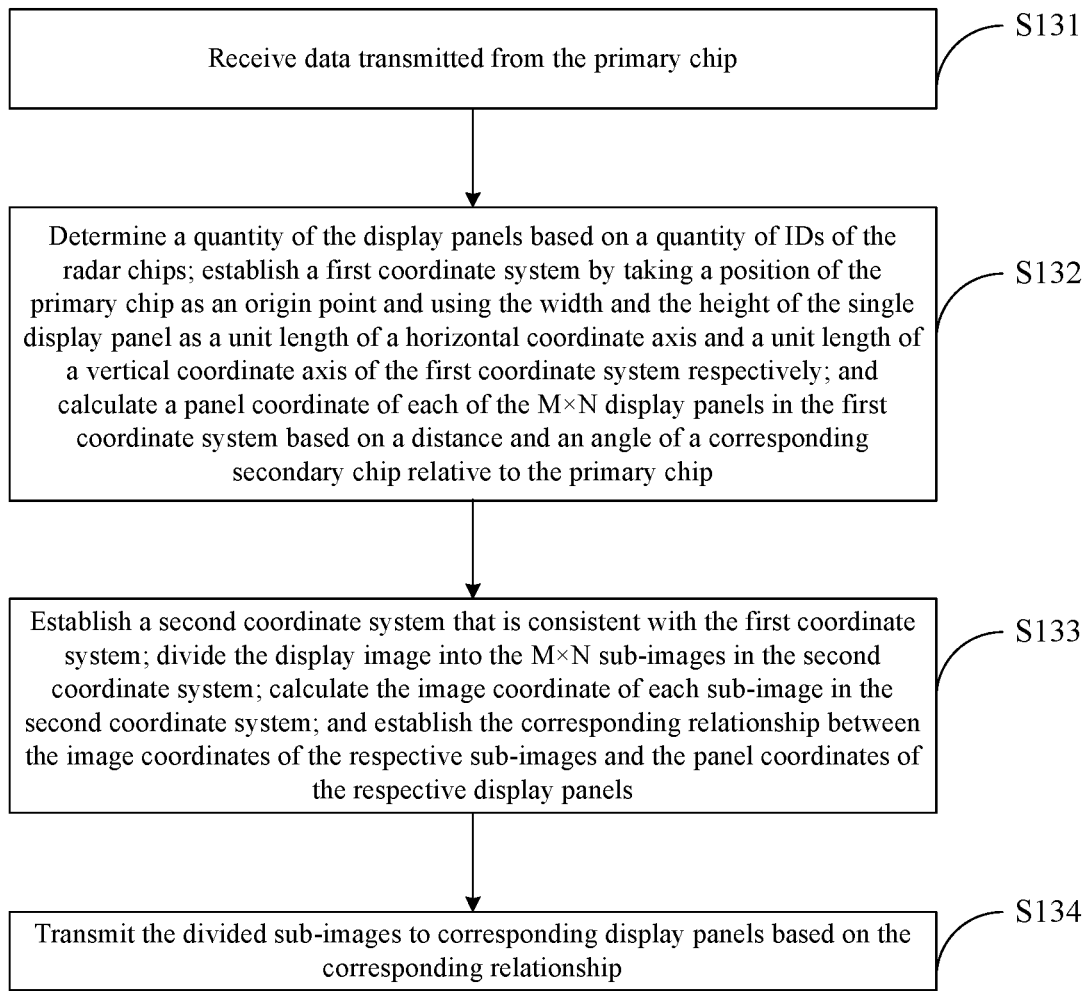
FIG. 5 is an example flowchart of Step S130 in FIG. 4.

In the embodiment, a specific flowchart of the step S130 is shown in FIG. 5 and includes:

S131: receiving data transmitted from the primary chip;

S132: determining a quantity of the display panels based on a quantity of IDs of the radar chips; establishing a first coordinate system by taking a position of the primary chip as an origin point, and using the width and the height of the single display panel as a unit length of a horizontal coordinate axis and a unit length of a vertical coordinate axis of the first coordinate system respectively; and calculating a panel coordinate of each of the M×N display panels in the first coordinate system based on a distance and an angle of a corresponding secondary chip relative to the primary chip.

S133: establishing a second coordinate system that is consistent with the first coordinate system; dividing the display image into the M×N sub-images in the second coordinate system; calculating the image coordinate of each sub-image in the second coordinate system; and establishing the corresponding relationship between the image coordinates of the respective sub-images and the panel coordinates of the respective display panels.

S134: transmitting the divided sub-images to corresponding display panels based on the corresponding relationship.

For the convenience of calculation, the radar chip of the display panel on the lower left corner of the display array is taken as the primary chip. Moreover, each radar chip is disposed at a same position within a respective display panel.

The splicing-screen display system provided by the embodiments of the present disclosure may further include one or more processors and one or more memories. The processor may process data signals and may include various computing architectures such as a complex instruction set computer (CISC) architecture, a reduced instruction set computer (RISC) architecture or an architecture for implementing a combination of multiple instruction sets. The memory may store instructions and/or data executed by the processor. The instructions and/or data may include codes which are configured to achieve some functions or all the functions of one or more devices in the embodiments of the present disclosure. For instance, the memory includes a dynamic random access memory (DRAM), a static random access memory (SRAM), a flash memory, an optical memory or other memories well known to those skilled in the art.

In some embodiments of the present disclosure, the image sending device include codes and programs stored in the memories; and the processors may execute the codes and the programs to achieve some functions or all the functions of the image sending device.

In some embodiments of the present disclosure, the image sending device may be a specialized hardware device and configured to achieve some or all the functions of the image sending device. For instance, the image sending device may be a circuit board or a combination of a plurality of circuit boards and configured to achieve the above functions. In embodiments of the present disclosure, the circuit board or a combination of the plurality of circuit boards may include: (1) one or more processors; (2) one or more non-transitory computer-readable memories connected with the processors; and (3) processor-executable firmware stored in the memories.

In the present disclosure, terms such as "first", "second" and the like used in the present disclosure do not indicate any sequence, quantity or significance but only for distinguishing different constituent parts. Also, the terms such as "a," "an," or "the" etc., are not intended to limit the amount, but indicate the existence of at lease one. The terms "comprises," "comprising," "includes," "including," etc., are intended to specify that the elements or the objects stated before these terms encompass the elements or the objects and equivalents thereof listed after these terms, but do not preclude the other elements or objects.

The foregoing are merely specific embodiments of the disclosure, but not limitative to the protection scope of the disclosure. One skilled in the art could devise variations or replacements that within the scope and the spirit of the present disclosure, those variations or replacements shall belong to the protection scope of the disclosure. Thus, the protection scope of the disclosure shall be defined by the accompanying claims.

The present disclosure claims the benefits of Chinese patent application No. 201610134786.5, which was filed on Mar. 9, 2016 and is incorporated herein in its entirety by reference as part of this application.

What is claimed is:

1. A splicing-screen display system, comprising:
M×N display panels which are spliced together to form a display array, wherein any one of the M×N display panels is selected as a reference display panel, and M and N are both integers greater than one; and
an image sending device; wherein:
each display panel includes a radar chip, wherein a radar chip included in the reference display panel is a primary chip, and other radar chips included in other display panels except for the reference display panel are secondary chips, and the primary chip directly interacts with the secondary chips through electromagnetic waves;
the primary chip is configured to:
acquire a distance and an angle of each secondary chip relative to the primary chip by interacting with the corresponding secondary chip, wherein the angle of the secondary chip relative to the primary chip is an angle of a connecting line that connects a center of the primary chip and a center of the secondary chip relative to a horizontal or vertical direction; and
send size information of a single display panel, chip information of each secondary chip and position information of each secondary chip relative to the primary chip to the image sending device; and
the image sending device is configured to:
calculate a panel coordinate of each display panel corresponding to a respective secondary chip based on the distance and the angle of the respective secondary chip relative to the primary chip and the size information;
divide a display image into M×N sub-images, and calculate an image coordinate of each sub-image; and
send the M×N sub-images respectively to the M×N display panels in a one-to-one correspondence, based on corresponding relationship between image coordinates of the M×N sub-images and panel coordinates of the M×N display panels.

2. The splicing-screen display system according to claim 1, wherein:
the chip information of each secondary chip includes an ID of the secondary chip.

3. The splicing-screen display system according to claim 2, wherein the display panels have a same size, and the size information includes a height and a width of each display panel.

4. The splicing-screen display system according to claim 1, wherein the primary chip calculates the panel coordinate of each display panel corresponding to the respective secondary chip based on the distance and the angle of the respective secondary chip relative to the primary chip and the size information at least by:
calculating a coordinate of each display panel corresponding to the respective secondary chip relative to the reference display panel in a first coordinate system based on the distance and the angle of the respective secondary chip relative to the primary chip and the size information.

5. The splicing-screen display system according to claim 3, wherein the image sending device includes:
a signal receiving unit configured to receive data transmitted from the primary chip, wherein the data includes the size information, the chip information of each secondary chip and the distance and the angle of each secondary chip relative to the primary chip;
a coordinate calculating unit configured to:
determine a quantity of the display panels based on a quantity of IDs of the radar chips;
establish a first coordinate system by taking a position of the primary chip as an origin point, and use the width and the height of each display panel as a unit length of a horizontal coordinate axis and a unit length of a vertical coordinate axis of the first coordinate system respectively; and
calculate a panel coordinate of each of the M×N display panels in the first coordinate system based on a distance and an angle of a corresponding secondary chip relative to the primary chip;
an image dividing unit configured to:
establish a second coordinate system that is consistent with the first coordinate system;
divide the display image into the M×N sub-images in the second coordinate system;
calculate the image coordinate of each sub-image in the second coordinate system; and
establish the corresponding relationship between the image coordinates of the M×N sub-images and the panel coordinates of the M×N display panels; and
an image transmitter configured to transmit the sub-images to corresponding display panels based on the corresponding relationship.

6. The splicing-screen display system according to claim 1, wherein the reference display panel is a display panel on a lower left corner of the display array, and the primary chip is a radar chip in the reference display panel.

7. The splicing-screen display system according to claim 1, wherein each radar chip is disposed at a same position within a respective display panel.

8. A splicing display method of the splicing-screen display system according to claim 1, comprising:
acquiring a distance and an angle of each secondary chip relative to the primary chip by using the primary chip to send a radar wave and to receive feedback of the radar wave from each secondary chip;
sending, by the primary chip, the distance and the angle of each secondary chip relative to the primary chip, a prestored height and width of a single display panel, and an ID of each radar chip to the image sending device;
calculating, by the image sending device, a panel coordinate of each display panel corresponding to a respective secondary chip relative to the reference display panel based on a distance and an angle of the respective secondary chip relative to the primary chip and the height and the width of the single display panel;

dividing, by the image sending device, the display image into the M×N sub-images and calculating an image coordinate of each sub-image; and sending, by the image sending device, each sub-image to the corresponding display panel based on the corresponding relationship between the image coordinates of the M×N sub-images and the panel coordinates of the M×N display panels.

9. The splicing display method according to claim 8, wherein calculating, by the image sending device, the panel coordinate of each display panel corresponding to the respective secondary chip relative to the reference display panel, includes:

determining a quantity of the display panels based on a quantity of IDs of the radar chips;

establishing a first coordinate system by taking a position of the primary chip as an origin point, and using the width and the height of the single display panel as a unit length of a horizontal coordinate axis and a unit length of a vertical coordinate axis of the first coordinate system respectively; and calculating a panel coordinate of each of the M×N display panels in the first coordinate system based on a distance and an angle of a corresponding secondary chip relative to the primary chip.

10. The splicing display method according to claim 9, wherein dividing, by the image sending device, the display image into the M×N sub-images and calculating the image coordinate of each sub-image includes:

establishing a second coordinate system that is consistent with the first coordinate system;

dividing the display image into the M×N sub-images in the second coordinate system;

calculating the image coordinate of each sub-image in the second coordinate system; and establishing the corresponding relationship between the image coordinates of the M×N sub-images and the panel coordinates of the M×N display panels.

11. The splicing display method according to claim 8, wherein the reference display panel is a display panel on a lower left corner of the display array, and the primary chip is a radar chip in the reference display panel.

12. The splicing display method according to claim 8, wherein each radar chip is disposed at a same position within a respective display panel.

13. The splicing-screen display system according to claim 1, wherein the image coordinate of each sub-image includes a horizontal coordinate value and a vertical coordinate value that are respectively identical to a horizontal coordinate value and a vertical coordinate value of the panel coordinate of the display panel that corresponds to the sub-image.

14. The splicing-screen display system according to claim 7, wherein a horizontal distance and a vertical distance between two adjacent radar chips are a width and a height of each display panel respectively.

15. The splicing-screen display system according to claim 1, wherein the M×N display panels each have a same size, and the display array is in a shape of rectangle.

\* \* \* \* \*